US008086902B2

(12) United States Patent
Rashevsky et al.

(10) Patent No.: US 8,086,902 B2
(45) Date of Patent: Dec. 27, 2011

(54) METHOD AND APPARATUS FOR TESTING MEDIA PLAYER SOFTWARE APPLICATIONS

(75) Inventors: Vladislav Rashevsky, Redmond, WA (US); Cagri Aslan, Redmond, WA (US); Daniel Caruso, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1289 days.

(21) Appl. No.: 11/787,359

(22) Filed: Apr. 16, 2007

(65) Prior Publication Data

US 2008/0256394 A1 Oct. 16, 2008

(51) Int. Cl.
*G06F 11/00* (2006.01)
(52) U.S. Cl. .......................... 714/38.1; 714/33; 386/263
(58) Field of Classification Search .................. 714/25, 714/32, 33, 38, 38.1, 37, 40, 41, 47, 47.1, 714/47.3; 386/263, 268
See application file for complete search history.

(56) References Cited

U.S. PATENT DOCUMENTS

| | | | |
|---|---|---|---|
| 6,067,639 A | 5/2000 | Rodrigues et al. | |
| 6,400,400 B1 * | 6/2002 | Isnardi et al. | 348/180 |
| 6,414,960 B1 | 7/2002 | Kuhn et al. | |
| 6,819,327 B2 * | 11/2004 | Wasserman et al. | 714/37 |
| 6,831,647 B1 * | 12/2004 | Dotson | 714/25 |
| 6,850,691 B1 | 2/2005 | Stam et al. | |
| 7,113,880 B1 | 9/2006 | Rhea et al. | |
| 7,152,209 B2 | 12/2006 | Jojic et al. | |
| 7,702,994 B2 * | 4/2010 | Ramanzin | 714/807 |
| 2002/0133247 A1 | 9/2002 | Smith et al. | |
| 2002/0146236 A1 * | 10/2002 | Kauffman et al. | 386/55 |
| 2003/0076418 A1 * | 4/2003 | Nishio | 348/180 |
| 2004/0136327 A1 | 7/2004 | Sitaraman et al. | |
| 2004/0148362 A1 | 7/2004 | Friedman | |
| 2004/0255276 A1 | 12/2004 | Rovang | |
| 2004/0267940 A1 | 12/2004 | Dideriksen et al. | |
| 2004/0268224 A1 | 12/2004 | Balkus et al. | |
| 2004/0268400 A1 | 12/2004 | Barde et al. | |
| 2005/0022127 A1 | 1/2005 | Meyers et al. | |
| 2005/0076380 A1 * | 4/2005 | Magras et al. | 725/107 |
| 2005/0268285 A1 | 12/2005 | Bagley et al. | |

(Continued)

OTHER PUBLICATIONS

"Eggplant™ Purple", Date: 2006, http://www.redstonesoftware.com/products/purple/index.html.
"Eclipse Test and Performance Tools Platform Project", Date: 2005, http://www.eclipse.org/tptp/test/documents/userguides/Intro-Auto-GUI.html.

(Continued)

*Primary Examiner* — Robert Beausoliel, Jr.
*Assistant Examiner* — Joseph D Manoskey
(74) *Attorney, Agent, or Firm* — Mayer & Williams P.C.

(57) ABSTRACT

A method, system and program application is provided for automatically testing the operation of a media player with media files (e.g., video files) that are embodied in various formats. In one illustrative example visually encoded metrics are embedded in a media file that is to serve as a test file. These metrics can be detected and decoded when the test file is rendered by the media player. A testing program automatically executes various playback commands to simulate the way a user would operate the media player when viewing a media file. The testing program captures the media player's display buffer after the execution of each command. The display buffer includes the frame or frames that are played by the media player as a result of the commands. The metric or metrics embedded in the captured frames are detected and decoded and compared to a database that includes the metric or metrics that would be expected if the media player is correctly playing the test file.

18 Claims, 5 Drawing Sheets

U.S. PATENT DOCUMENTS

| | | |
|---|---|---|
| 2006/0070035 A1 | 3/2006 | Ulrich et al. |
| 2006/0253741 A1 | 11/2006 | Garakani |
| 2007/0022407 A1 | 1/2007 | Givoni et al. |
| 2007/0032982 A1* | 2/2007 | Briere et al. ............... 702/178 |
| 2008/0263402 A1* | 10/2008 | Braysy ........................ 714/32 |
| 2009/0198484 A1* | 8/2009 | Christensen et al. ......... 703/22 |
| 2010/0058409 A1* | 3/2010 | Chapman et al. ............ 725/106 |

OTHER PUBLICATIONS

"Squish Overview", Date: 2007, http://www.froglogic.com/pg?id=Products&category=squish&sub=overview&subsub=overview.

* cited by examiner

METHOD AND APPARATUS FOR TESTING MEDIA PLAYER SOFTWARE APPLICATIONS

BACKGROUND

One very important part of the software development process is software testing. Testing refers to the process of repetitively executing portions of a computer program to ensure that the program is functioning correctly and to identify errors within the executing program code. Testing is often performed by a human user of the computer. In addition to being time consuming and tedious, human verification can be error prone. The accuracy of the test is the sole responsibility of the tester. The results of such testing can be inaccurate and inconsistent since one tester may find a program to pass a given test while another tester may find the program to fail the same test, even though the test results are exactly the same in both cases. In addition to limitations in accuracy, manual testing also has time and speed limitations that make it difficult or impossible for the tester to assess the test results as they are presented in real-time.

However, because the testing process can be very repetitive, and therefore stressful on humans, automated testing programs have been developed that simulate human user input to a computer program. In particular, scripts can be generated for use with an automated testing program that simulates user input to the program to be tested in a particular order. For instance, a script may contain instructions for entering keystrokes, mouse movement and selection, and other types of user input commands. In order to thoroughly test a computer program, such scripts can be executed repetitively by the automated testing program on the program to be tested.

Software programs that are particularly susceptible to errors when being manually tested include applications that involve video processing (e.g., video composing, encoding, compression, decoding). For instance, one example of a decoding or rendering application is a media player. A media player typically processes multimedia data through a series of steps that include reading a data file, parsing the data into separate data streams (e.g., a video stream and audio stream), decoding each data stream, and rendering the data streams for presentation (e.g., on a video display or audio speaker). The various media that may be rendered by a media player may include, but is not limited to, audio, video, graphic, pictorial, text, and music, and any combination thereof. While media players may include specialized interfaces such as electronic devices (DVD and CD players, portable compressed audio players and other common devices), increasingly more media is being transmitted for viewing through browser interfaces for use on computers, personal digital assistants, Internet-enabled wireless telephones and the like. Popular forms of these media players include Windows Media Player by Microsoft, Quicktime by Apple, and RealOne players by RealNetworks. These media players, which may be generically referred to as rendering applications, are displayed through browsers such as Microsoft Windows, Netscape, Mozilla or other browsers.

The process of testing applications involving video or even audio processing media players can be particularly difficult to automate because the test results are generally presented as a visual image or as audio, which does do not lend themselves to easy quantification. That is, the results of such testing must be verified by visual or auditory inspection to ensure that the correct content is being presented and that it is being presented without distortion or any unrequested alterations. In addition, it is simply not feasible for a person to verify content at real-time video speeds (e.g., 24-30 frames/sec).

This Background is provided to introduce a brief context for the Summary and Detailed Description that follows. This Background is not intended to be an aid in determining the scope of the claimed subject matter nor be viewed as limiting the claimed subject matter to implementations that solve any or all of the disadvantages or problems presented above.

SUMMARY

A method, system and program application is provided for automatically testing the operation of an application (e.g., media player) with media files (e.g., video files) that are embodied in various formats. In one illustrative example visually encoded metrics are embedded in a media file that is to serve as a test file. These metrics can be detected and decoded when the test file is rendered by the application. A testing program automatically executes various playback commands to simulate the way a user would operate the application when viewing a media file. The testing program captures the application's display buffer after the execution of each command. The display buffer includes the frame or frames that are played by the application as a result of the commands. The metric or metrics embedded in the captured frames are detected and decoded and compared to a database that includes the metric or metrics that would be expected if the application is correctly playing the test file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

As detailed below, a method, system and program application is presented for testing the operation of an application involving video and/or processing. For purposes of illustration only and not as a limitation, a specific example of an application to be tested will be presented. In this example the application is a media player, which can be tested with media files that are embodied in various formats supported by the media player. Some formats that are commonly supported by various media players include, for instance, MP3, WMA, RealAudio, AAC, and WV for audio and MPEG, WMV, RealVideo and Flash for video. The media files that are rendered by the media player may be downloaded over a communications network (e.g., the Internet) or made available from a local source such as, for example, a DVD, a CD, a memory card, an email attachment stored on a local hard drive, and so on. Alternatively, instead of storing entire media files, the media player may render streaming media. Media streaming is a technique for transferring media content from a server to a client device, which processes the content as a steady and continuous stream using a media player residing on the client device. Unlike the process of downloading media files, once the bits representing content in a streaming media file have been rendered by the media player, the media player typically discards the bits. For purposes of illustration only and not as a limitation on the techniques presented herein, a media player will be presented that resides on a client and which renders content from a streaming media file.

Figure 1:
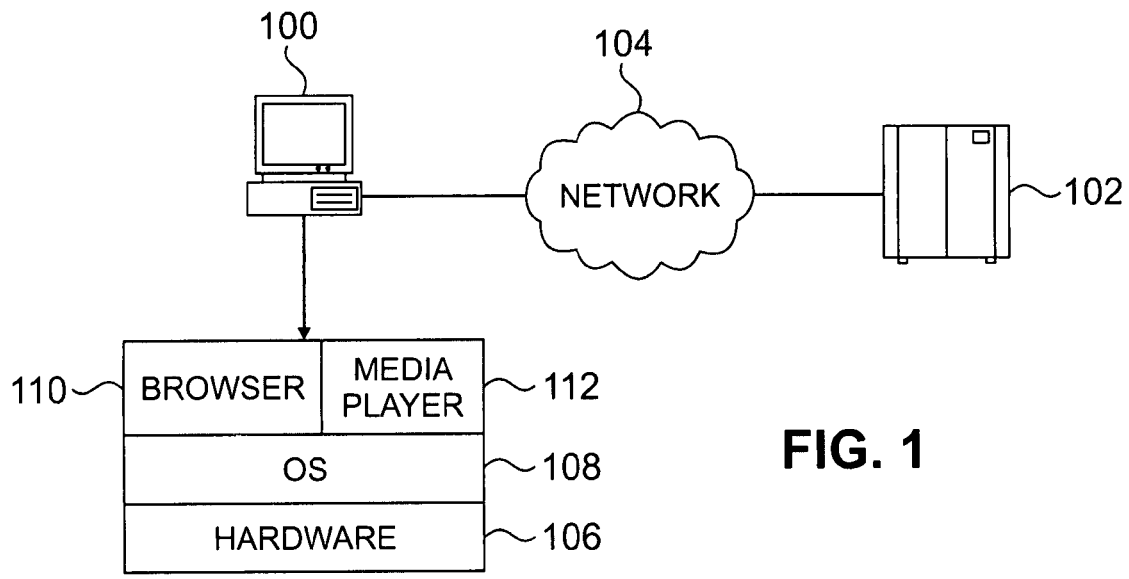
FIG. 1 illustrates one example of a conventional streaming delivery mechanism wherein a client 10 connects to a streaming media server via a communications network.

FIG. 1 illustrates one example of a conventional streaming delivery mechanism wherein a client 100 connects to a streaming media server 102 via a communications network 104, such as the Internet, an intranet, a content delivery network (CDN), or the like. The client 100 is typically a computer platform (e.g., fixed or portable devices, hand-held devices, multiprocessor systems, microprocessor-based or programmable consumer electronics, minicomputers, mainframe computers) having hardware 106, operating system software 108, a Web browser 110, and a media player 112. In a typical operation, an end user launches his or her browser 110 to a Uniform Resource Locator (URL) identifying the media stream that is desired. Once the client 100 is connected to the media server 102, the server delivers the stream over the network to the client browser 110, in which it is rendered by the media player 112.

Figure 2:
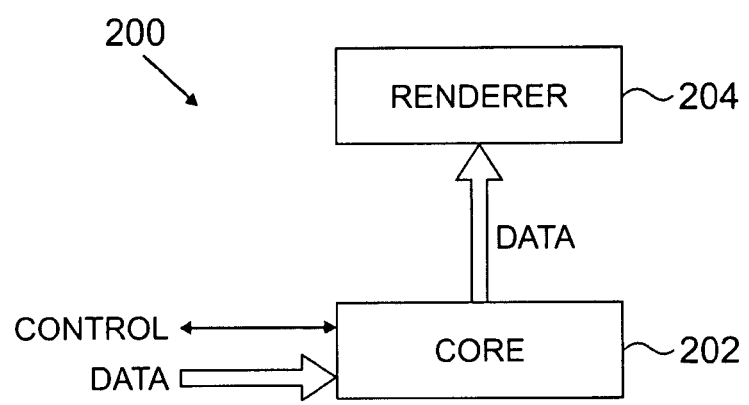
FIG. 2 shows the logical architecture of one example of a media player.

As illustrated in FIG. 2, a rendering application 200 such as a media player includes two primary components: a core 202, and a renderer 204. It should be noted that FIG. 2 is meant to provide a simplified logical representation of system elements to illustrate a media player. In reality, an actual rendering application or media player may contain several sub-modules with more complex structure implementing the core and renderer functionalities described below. The core 202 is responsible for transporting data received from the media server 102. Typically, the core 202 establishes a control channel to exchange control information with the media server. Such information may include requests from the player to describe, play, pause, stop the stream, feedback from the player on the perceived bandwidth, packet loss and other metrics, information from the server 102 on the media that is being requested, and so forth. In addition to the control channel, the core 202 typically establishes a data channel on which the actual media stream flows from the server to the client. The media stream is a series of packets containing audio, video, and text information. The core 202 can receive packets from the server several seconds ahead of the time that they must be rendered, and the packets arriving ahead of time are stored in a buffer (not shown). This provides an opportunity for the core 202 to re-request missing packets from the server and to recover them in time for such packets to be rendered appropriately. The renderer 204 receives packets from the core 202 and renders the data contained in the packet. The renderer 204 contains several functional units, one for each type of media, or there may be a separate renderer for each type. Audio information is rendered through the sound device on the client's computer, whereas video and text information are rendered on the client's display screen.

A media player receives instructions or commands through a user interface to render content in the media files in any number of different ways. For example, the simplest commands instruct the media player to render the content in a sequential manner. Such commands include normal play, fast-forward and rewind. More complex commands include scrubbing (i.e., stepping through the content, both forward and backward), sampling (i.e., trimming or selecting one or more sub-sections of the media file), stitching (i.e., combining two or more different sub-sections of a media file) and seeking a specific segment or frame in the media file. All these various commands should be tested when verifying the accuracy of a media player.

As previously mentioned, verifying the accuracy of a media player's rendering process is difficult to automate. To address this problem it is important to determine exactly what is to be verified during a conventional manual testing process. This can be reduced to several key questions. First, is the rendered content the content that is expected based on the command that was presented to the media player? Second, was the content altered by the media player in a way that was not expected based on the command that was initiated? Third, did the media player respond to the command in a timely manner?

Given these questions, the next issue to be resolved concerns the type of information that is needed to answer them. In many case the information that is needed is relatively straightforward. For instance, for many rendering commands such as normal play, fast-forward, rewind, chapter or segment selection and the like, it is important to know where the rendered content is sequentially located relative to the entire media stream or file. If, for instance, the rendering command instructs the media player to fastforward through the content for a certain amount of time or, in the case of a video file, a certain number of frames, etc., then the resulting content that should be rendered if the media player operates correctly can be readily determined (e.g., fastforwarding from the beginning of a video file for 5 seconds yields, say, frame number 30). Whether the rendered content does in fact correspond to the content that is expected to be rendered can be automatically determined without user intervention if the frames or other segments of the content each include a metric that easily identifies the sequential portion of the frame or segment. In the case of a video file, the metric may be a visual identifier overlaying the content contained in the frame. The visual identifier simply serves as a counter that denotes the sequential number of the frame in the entire series of frames that make up the video file (e.g., the metric may indicate that frame number 30 is currently being rendered). In some cases the visual identifier may be simply an SMPTE timecode, which is standard for labeling individual frames of video or film with a timecode defined by the Society of Motion Picture and Television Engineers (SMPTE).

The visual metric that overlays the content in each frame may be a series of blocks, bullets, lines, barcodes or the like that represents a binary string. Each block can be color coded, with one color representing a first binary state and another color representing a second binary state. Alternatively, a barcode or other geometric coding scheme may be used instead of a color coding scheme.

In addition to a metric denoting sequential position, another important metric concerns the manner in which the rendered content is presented. That is, simply because the media player renders the correct content in response to a command does not necessarily mean that this content will be correctly perceived by the consumer of the content. In the case of a video file, the presentation will often include the spatial location, orientation and size of the content being rendered by the media player. In other words, the question to be answered in the case of a video file is whether the media player correctly plays the content on a display (e.g., does the content properly fit within the window presented by the media player on the display?).

The two metrics discussed above, one relating to sequence and the other relating to presentation, are merely two examples of metrics that may be used to verify the accuracy of a media player. Those of ordinary skill in the art will recognized that many other metrics may be employed in addition to or instead of those presented above.

In accordance with the techniques, methods and systems presented herein, the proper functioning of a media player is tested using a test media file that is developed for this purpose. The test media file may be an otherwise conventional media file in which one or more metrics are embedded in each segment (e.g., frame) of the test file. A testing program can then be used to issue a series of rendering commands to a media player to test the media player's ability to correctly render the test file in accordance with each command. The testing program can be a relatively straightforward script program that simulates in an automatic manner a series of commands that an individual may wish to execute with the media player via a user interface such as mouse, keyboard and the like. As previously mentioned, such commands may include normal play, fast-forward, rewind, scrubbing, sampling, stitching and seeking a specific segment or frame in the media file. The content included in the test file generally will be immaterial to the proper execution of the test process, provided that the nature of the content (e.g., video, audio, text and graphics) conforms to a type of media that can be rendered by the media player being tested.

As the test program executes each command, the content, including the embedded metric or metrics, which is rendered by the media player as a result of the command, is captured. The captured metric can be compared to the metric (and hence the content) that is expected if the media player is functioning properly. The comparison may be conveniently performed by accessing a database that for each test file relates each rendering command with the content and associated metric that is expected to be rendered by that command. If the test file is a video file, for instance, the rendered content may be a video frame that is captured from the display buffer of the media player. Similarly, if the test file is an audio file, the rendered content may be an audio segment that is captured from the audio buffer of the media player.

Figure 3:
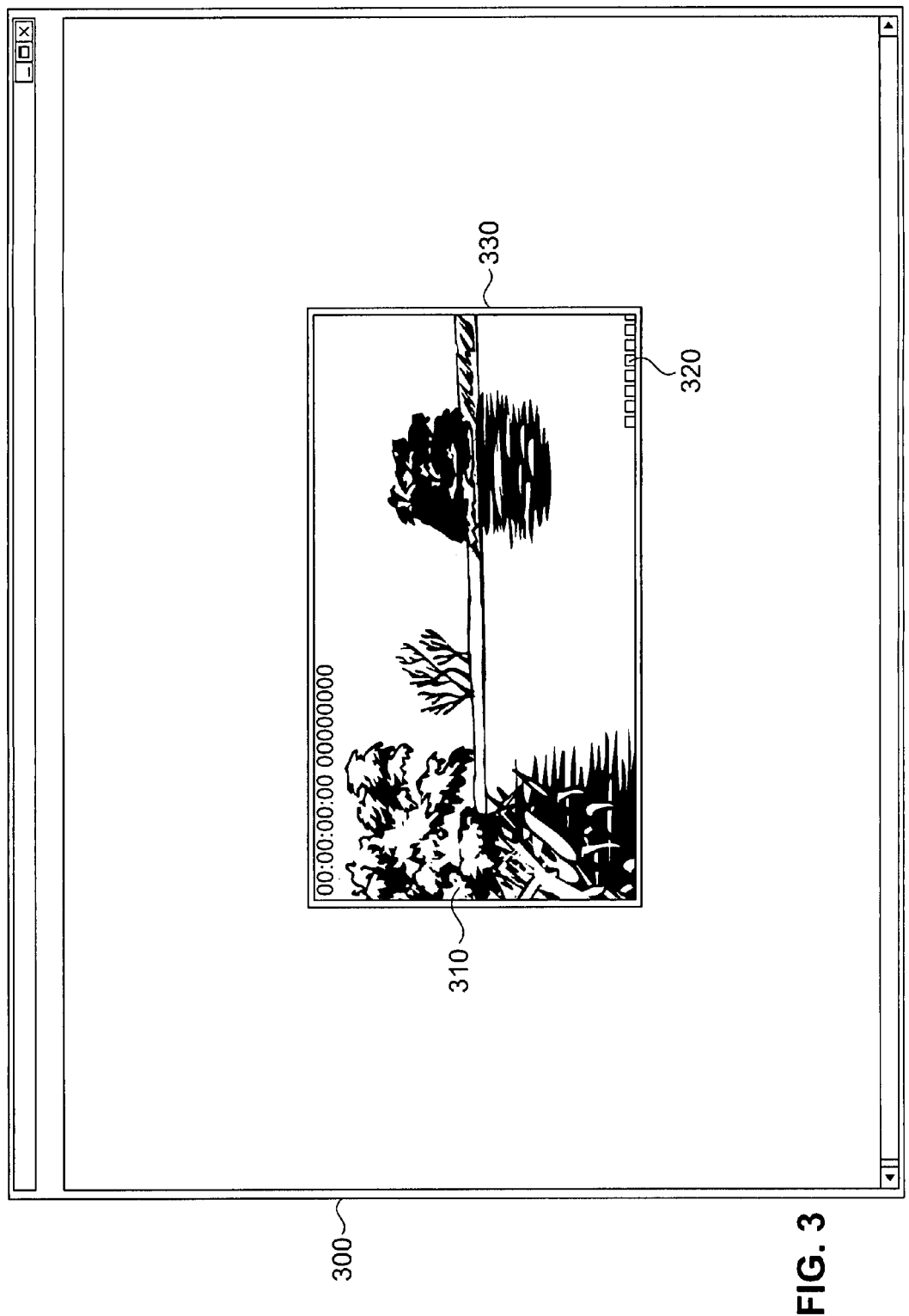
FIG. 3 shows one example of a window that may be presented by the testing program while testing the media player.

FIG. 3 shows an example of a window 300 that may be presented by the testing program. One frame 310 of a test file rendered by the media player being tested is shown in a display portion of window 300. As shown, frame 310 includes a first metric 320, which is shown as a series of eight blocks that are color coded to represent an eight bit binary string. The first metric 320 is used to determine the sequential position of the rendered frame in the test file. Also shown in frame 310 is a second metric, represented by border 330, which is used to spatially locate the frame in the display of the window 300 to ensure that the media player is properly presenting the frame with respect to size, position and orientation.

Figure 4:
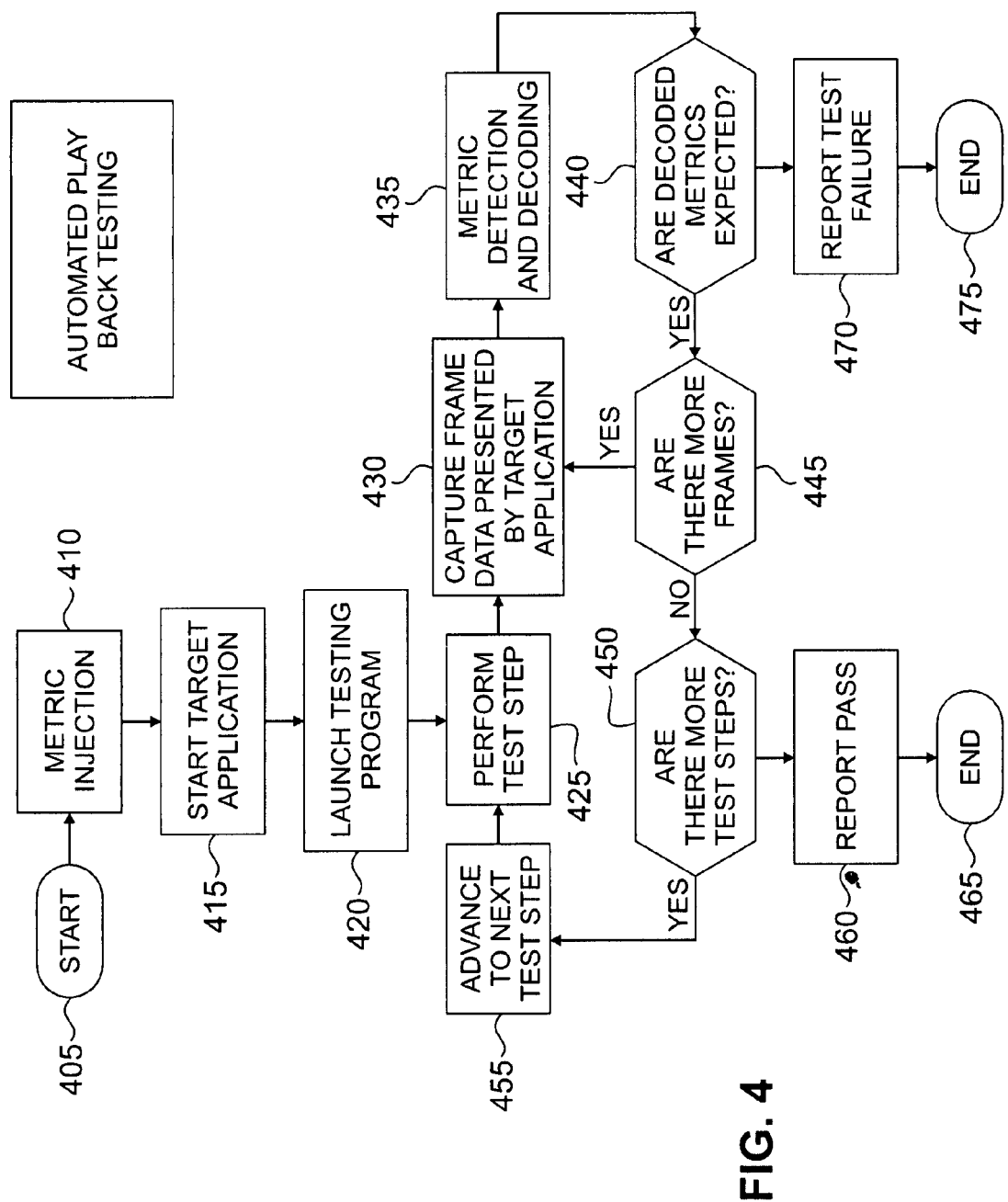
FIG. 4 is flowchart showing one particular example of a method for testing a media player.

FIG. 4 is flowchart showing one particular example of a method for testing a media player. For purposes of illustration the media player to be tested is assumed to be a video player and the test file is assumed to be video file. The method begins in step 405 by providing a video file that is to serve a test file. The appropriate metrics are inserted into each segment or frame of the media file in step 410. The media player to be tested (i.e., the target application) is launched in step 415 and loaded with the test file. Likewise, the testing program is launched in step 420 and the first step (i.e., the first rendering command) is performed on the test file in step 425. The frame that is rendered by the media player as a result of the first rendering command is captured in step 430 and the metric or metrics that are embedded in the rendered frame are detected and decoded in step 435. In step 440, each decoded metric is compared to the metric that is expected if the media player properly rendered the test file in accordance with the first rendering command. If the decoded metric does not match the expected metric then a failure is reported in step 470 and the process is terminated in step 475. On the other hand, if the decoded metric does match the expected metric, the process continues in decision step 445 in which it is determined if there are additional frames that have been rendered as a result of the first rendering command. If there are such additional frames, the process returns to step 430 in which, once again, the frame is captured and, in steps 435 and 440, the metric or metrics are detected and decoded and compared to the expected metric or metrics. Returning to decision step 445, if there are no additional frames that have been rendered by the first rendering command, the process continues with decision step 450 in which it is determined if there are more rendering commands to be executed by the testing program. If so, the process advances to the next rendering command in step 455, which is then executed in step 425, after which the process continues as described above. On the other hand, if in step 450 it is determined that there are no additional rendering commands to be executed by the testing program, then the media player has successfully rendered the test file and this result is reported in step 460, after which the process terminates in step 465.

Figure 5:
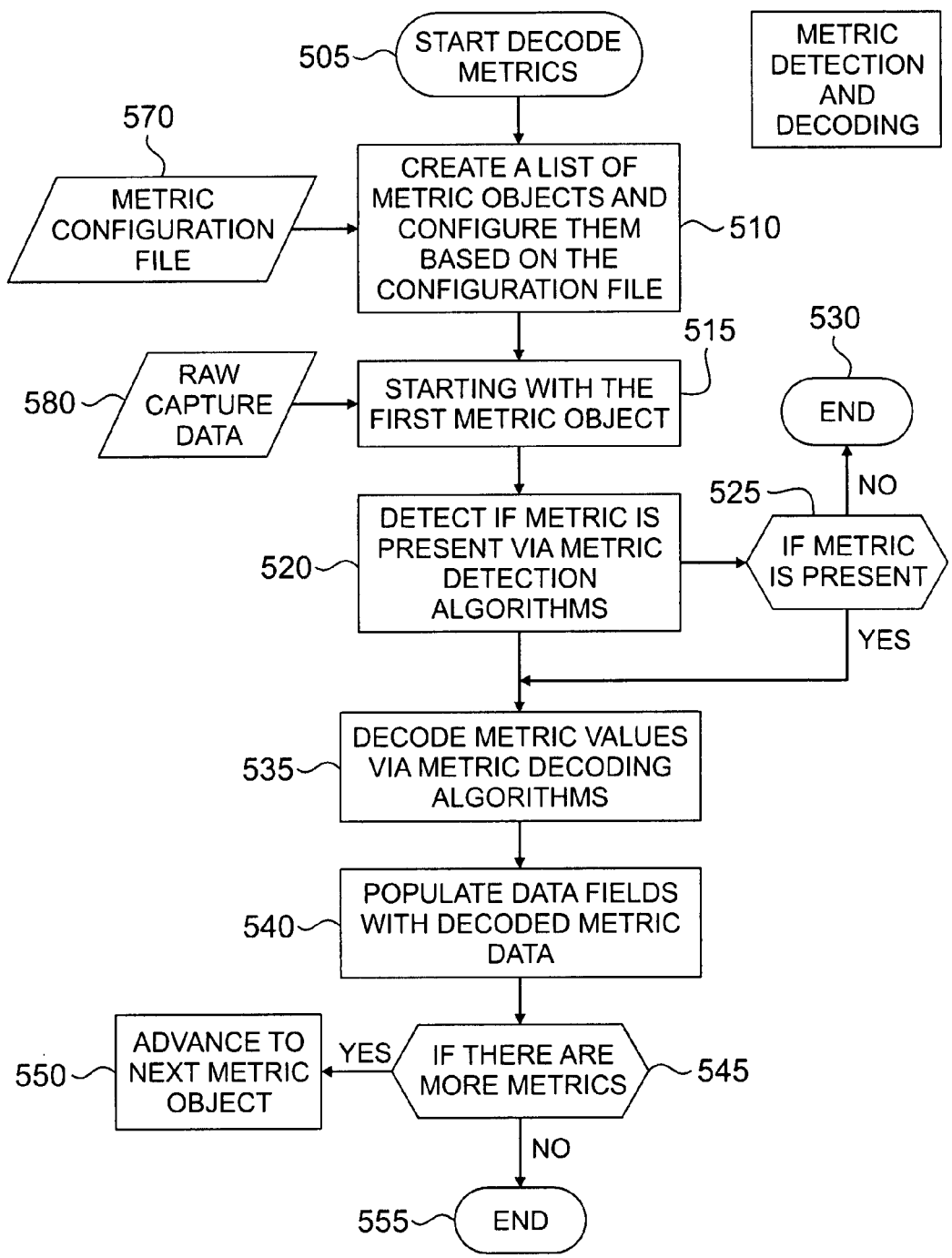
FIG. 5 is a flow chart showing one example of a method for detecting and decoding the metric or metrics that are embedded in the test file used to test the media player.

FIG. 5 is a flow chart showing one example of a method for detecting and decoding the metric or metrics that are embedded in the test file. That is, the process shown in FIG. 5 can be used to implement step 435 in FIG. 4. The process begins in step 505 in which the detection and decoding process is initiated. In step 510 a list of metric objects is created and configured based on information contained in configuration file 570. Next, in step 515 the first metric object is selected and in step 520 the data in the captured frame is obtained from data file 580 and examined for the presence of the first metric object using an appropriate detection algorithm. If in decision step 525 the metric is not found to be present the process terminates in step 530. If in decision step 525 the metric is found to be present in the captured frame, then the metric is decoded in step 535 using an appropriate decoding algorithm. The fields of a data file are then populated with the decoded metric data in step 540 so that they may be subsequently compared to the expected metrics. At decision step 545 it is determined if there are additional metrics available in list created in step 510. If so, the process advances to the next metric in step 550 and the process returns to step 520 in which it is determined if the next metric is present in the captured frame. If on the other hand there are no more metrics to be examined, the process terminates in step 555.

Figure 6:
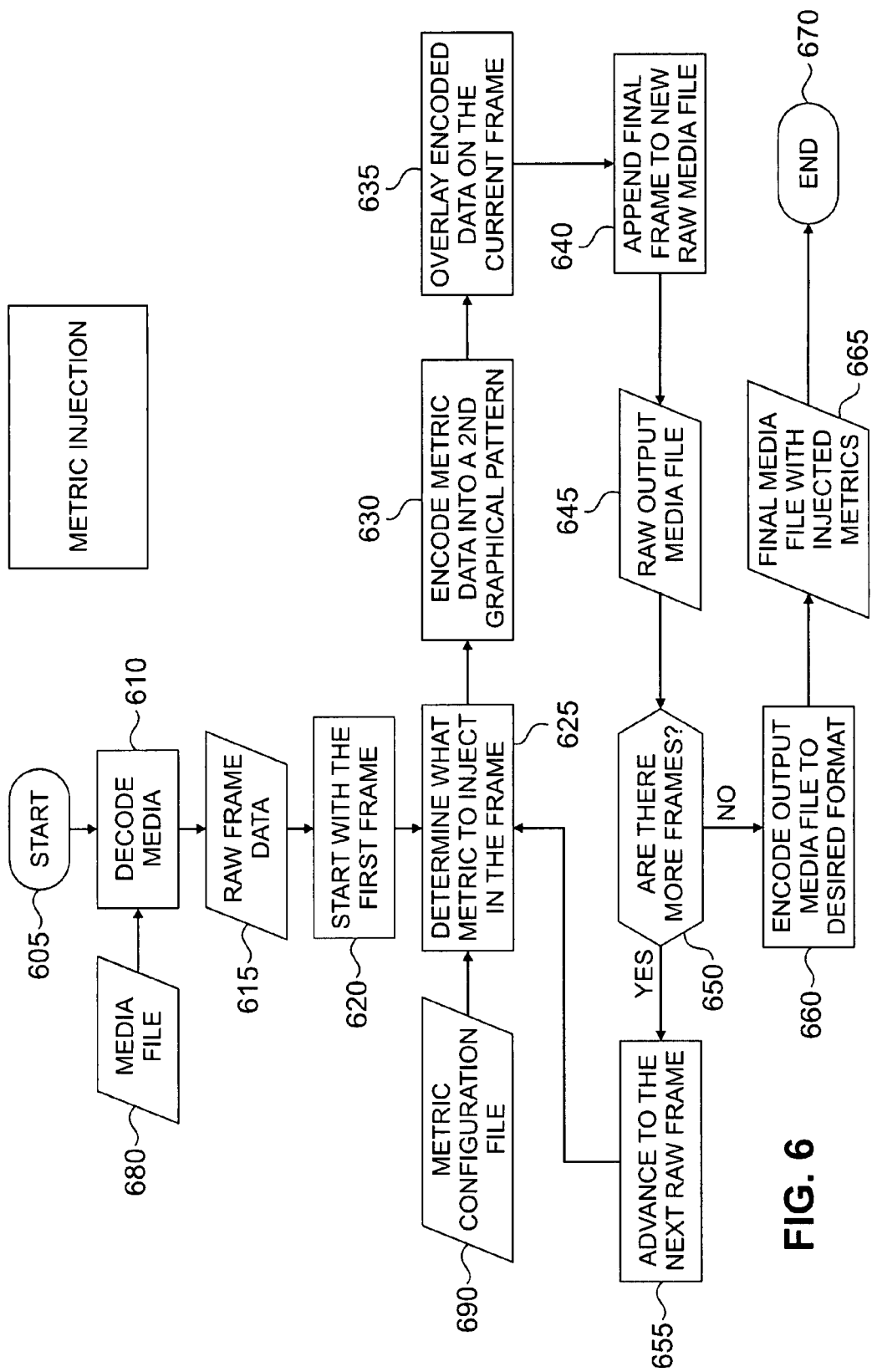
FIG. 6 is a flow chart showing one example of a method for inserting or injecting the metrics into the media file that is to serve as the test file.

FIG. 6 is a flow chart showing one example of a method for inserting or injecting the metrics into the media file that is to serve as the test file. That is, the process shown in FIG. 6 can be used to implement step 410 in FIG. 4. The method begins in step 605 in which a media file 680 is obtained which is to serve as the test file. The media file 680, which is in a format that is supported by a media player (e.g., MPEG, WMV, RealVideo and Flash), is decoded in step 610 to generate a raw data file 615. The first frame of the raw data file is selected in step 620 and, based on the data in the metric configuration file 690, the appropriate metric to be injected in the frame is determined in step 625. The metric is encoded in an appropriate manner in step 630. For example, the metric may be encoded as a graphical pattern that represents a binary string.

The encoded data in the graphical pattern is embedded in the raw data for the current frame in step 635 so that the graphical pattern will overlay the frame when it is rendered. The frame, with the encoded metric, is appended to the raw data file in step 640 to generate an updated raw data file 645. If there are more frames in which metrics need to be embedded as determined in decision step 650, then the next frame is selected in step 655 and the process returns to step 625. If in decision step 650 it is determined that there are no more frames in which a metric is to be embedded, the final updated raw data file is encoded in step 660 into the desired format that is supported by the media player to be tested to provide test file 665, after which the process terminates at step 670.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of testing an application, comprising:
    loading a test file into the application, the test file including a plurality of content segments that each have at least one metric reflecting a known characteristic of the content segment;
    instructing the application to render at least a portion of the test file in a prescribed manner, wherein the prescribed manner in which the test file is instructed to be rendered is selected from the group consisting of sequential playback, scrubbing, location-specific searching and stitching;
    capturing the rendered portion of the test file;
    detecting and decoding the metric associated with at least one of the content segments located in the captured portion of the test file;
    comparing the decoded metric to a first metric that is expected when the test file is rendered in the prescribed manner; and
    reporting that the decoded metric successfully or unsuccessfully matched the expected metric.

2. The method of claim 1 wherein each of the content segments is a video frame and the metric associated with the video frame is a visual metric overlying other visual content included in the video frame.

3. The method of claim 2 wherein the visual metric includes a visually encoded binary string of data.

4. The method of claim 3 wherein the binary string of data is visually encoded using a different color for each bit value.

5. The method of claim 3 wherein the visual metric represents a sequential position of the frame in the test file.

6. The method of claim 2 wherein the rendered portion of the test file is captured as a screen shot.

7. The method of claim 3 wherein the binary metric is visually encoded using a two-dimensional graphical representation.

8. A method of testing an application, comprising:
    loading a test file into the application, the test file including a plurality of content segments that each have at least one metric reflecting a known characteristic of the content segment;
    instructing the application to render at least a portion of the test file in a prescribed manner;
    capturing the rendered portion of the test file;
    detecting and decoding the metric associated with at least one of the content segments located in the captured portion of the test file;
    comparing the decoded metric to a first metric that is expected when the test file is rendered in the prescribed manner; and
    reporting that the decoded metric successfully or unsuccessfully matched the expected metric,
        wherein each of the content segments is a video frame and the metric associated with the video frame is a visual metric overlying other visual content included in the video frame,
        wherein the visual metric includes a visually encoded binary string of data, and
        wherein the visual metric represents a spatial feature of the frame in the test file.

9. The method of claim 8 wherein the spatial feature is selected from the group consisting of a location, size and orientation of the frame.

10. A method of creating a test video file for use in testing an application, comprising:
    providing a video file that includes a plurality of video frames;
    injecting a first visual metric into each of the video frames, the visual metric reflecting a known characteristic of the video frame;
    injecting a second visual metric into each of the video frames, the second visual metric reflecting a second known characteristic of the frame; and
    encoding the video file, including the metrics associated therewith, into a format supported by the rendering application to be tested.

11. The method of claim 10 wherein the first visual metric includes a visually encoded string of data.

12. The method of claim 11 wherein the visually encoded string is a binary string.

13. The method of claim 11 wherein the string of data is visually encoded using a different color, shape or position for each bit value.

14. The method of claim 11 wherein the first visual metric represents an ordered position of the frame in the test file.

15. The method of claim 11 wherein the first visual metric is visually encoded using a two-dimensional graphical representation.

16. The method of claim 10 wherein the first visual metric is a timecode.

17. The method of claim 16 wherein the timecode is an SMPTE timecode.

18. The method of claim 10 wherein the second visual metric represents a spatial feature of the frame in the video file.

* * * * *